US012535224B2

(12) United States Patent
Gore et al.

(10) Patent No.: US 12,535,224 B2
(45) Date of Patent: Jan. 27, 2026

(54) DOOR AND METHOD OF CONNECTING COMPONENTS OF A DOOR FOR A COOKING APPLIANCE

(71) Applicant: WHIRLPOOL CORPORATION, Benton Harbor, MI (US)

(72) Inventors: Rohan Gajananrao Gore, Stevensville, MI (US); Sarang Hemant Lokaksha, Pune (IN); Yogesh Vasant Sonone, Buldana (IN)

(73) Assignee: Whirlpool Corporation, Benton Harbor, MI (US)

( * ) Notice: Subject to any disclaimer, the term of this patent is extended or adjusted under 35 U.S.C. 154(b) by 789 days.

(21) Appl. No.: 17/695,401

(22) Filed: Mar. 15, 2022

(65) Prior Publication Data
US 2023/0296259 A1    Sep. 21, 2023

(51) Int. Cl.
*F24C 15/04* (2006.01)
*F24C 15/00* (2006.01)
*F24C 15/02* (2006.01)
*F24C 15/34* (2006.01)

(52) U.S. Cl.
CPC ............ *F24C 15/04* (2013.01); *F24C 15/005* (2013.01); *F24C 15/02* (2013.01); *F24C 15/021* (2013.01); *F24C 15/34* (2013.01)

(58) Field of Classification Search
CPC ...... F24C 15/04; F24C 15/005; F24C 15/021; F24C 15/34; F24C 15/02; F24C 15/00; F24C 15/024; F24C 23/02
USPC .............................. 126/198, 190, 200, 273 R
See application file for complete search history.

(56) References Cited

U.S. PATENT DOCUMENTS

| 9,347,674 | B2 | 5/2016 | Edwards et al. |
| 10,495,305 | B2 | 12/2019 | Lambkin et al. |
| 10,701,770 | B2 | 6/2020 | Jang et al. |
| 10,716,433 | B2 | 7/2020 | Kim et al. |
| 2007/0023029 | A1 | 2/2007 | Kelley |

(Continued)

FOREIGN PATENT DOCUMENTS

| DE | 3723761 A1 * | 3/1988 | ............... F24C 15/04 |
| DE | 20005863 U1 | 6/2001 | |

(Continued)

OTHER PUBLICATIONS

Machine Translation of JP 2012250398 (Year: 2012).*

(Continued)

*Primary Examiner* — Allen R. B. Schult
*Assistant Examiner* — Amy E Carter
(74) *Attorney, Agent, or Firm* — Price Heneveld LLP

(57) ABSTRACT

A door assembly for a cooking appliance includes an inner door assembly disposed adjacent a cooking cavity of the cooking appliance when the door assembly is in a closed position. An outer door assembly is coupled with the inner door assembly. The outer door assembly includes a panel. A skin bonds with the panel via an insulation arrangement disposed between the panel and the skin. The insulation arrangement includes a first adhesive that adheres the skin with a first surface of the insulation arrangement and a second adhesive that adheres the panel with a second surface of the insulation arrangement. A bonding feature extends from the skin to the panel to permanently bond the skin with the panel.

18 Claims, 6 Drawing Sheets

(56) References Cited

U.S. PATENT DOCUMENTS

| | | | |
|---|---|---|---|
| 2008/0246379 A1* | 10/2008 | Choudhary | F24H 9/0005 |
| | | | 312/400 |
| 2012/0060822 A1 | 3/2012 | Eberhard | |
| 2019/0145628 A1* | 5/2019 | Ladner | F16B 11/006 |
| | | | 126/200 |
| 2021/0071874 A1* | 3/2021 | Gopalakrishnan | F24C 15/006 |

FOREIGN PATENT DOCUMENTS

| | | | | |
|---|---|---|---|---|
| DE | 102008040763 A1 | | 2/2010 | |
| DE | 102011088073 A1 | * | 6/2013 | ............ F24C 15/04 |
| GB | 2310876 A | * | 9/1997 | ............ F24C 15/04 |
| JP | 2012250398 A | * | 12/2012 | |
| KR | 200308894 Y1 | * | 3/2003 | |
| WO | 2012037094 A2 | | 3/2012 | |

OTHER PUBLICATIONS

Machine Translation of KR 200308894 (Year: 2003).*
Machine Translation of DE 102011088073 (Year: 2013).*
Machine Translation of DE 3723761 (Year: 1988).*

* cited by examiner

DOOR AND METHOD OF CONNECTING COMPONENTS OF A DOOR FOR A COOKING APPLIANCE

BACKGROUND OF THE DISCLOSURE

The present disclosure generally relates to a door and method of connecting components of a door for a cooking appliance, and more specifically, to an outer door assembly for a cooking appliance door.

SUMMARY OF THE DISCLOSURE

According to one aspect of the present disclosure, a door for a cooking appliance includes an inner door assembly disposed adjacent a cooking cavity of the cooking appliance when the door assembly is in a closed position. An outer door assembly is coupled with the inner door assembly. The outer door assembly includes a panel. A skin bonds with the panel via an insulation arrangement disposed between the panel and the skin. The insulation arrangement includes a first adhesive that adheres the skin with a first surface of the insulation arrangement and a second adhesive that adheres the panel with a second surface of the insulation arrangement. A bonding feature extends from the skin to the panel to permanently bond the skin with the panel.

According to another aspect of the present disclosure, an outer door assembly for an oven includes a skin. A panel is disposed between a cooking cavity of the oven and the skin. An insulation arrangement is disposed between the panel and the skin. The insulation arrangement includes an adhesive disposed on a surface of the insulation arrangement that operably couples the skin with the panel.

According to yet another aspect of the present disclosure, a method used to assemble a door assembly of an oven includes a step where an insulation arrangement is coupled with a skin of the door assembly via a first adhesive disposed on a first surface of the insulation arrangement. A bonding feature is then applied to the skin adjacent the insulation arrangement to form a permanent bond between the skin and a panel of the door when the panel engages the bonding feature. Next, the insulation arrangement is coupled with the panel of the door assembly via a second adhesive disposed on a second surface of the insulation arrangement, opposite the first surface, to bond the skin with the panel while the permanent bond cures.

These and other features, advantages, and objects of the present disclosure will be further understood and appreciated by those skilled in the art by reference to the following specification, claims, and appended drawings.

Figure 1:
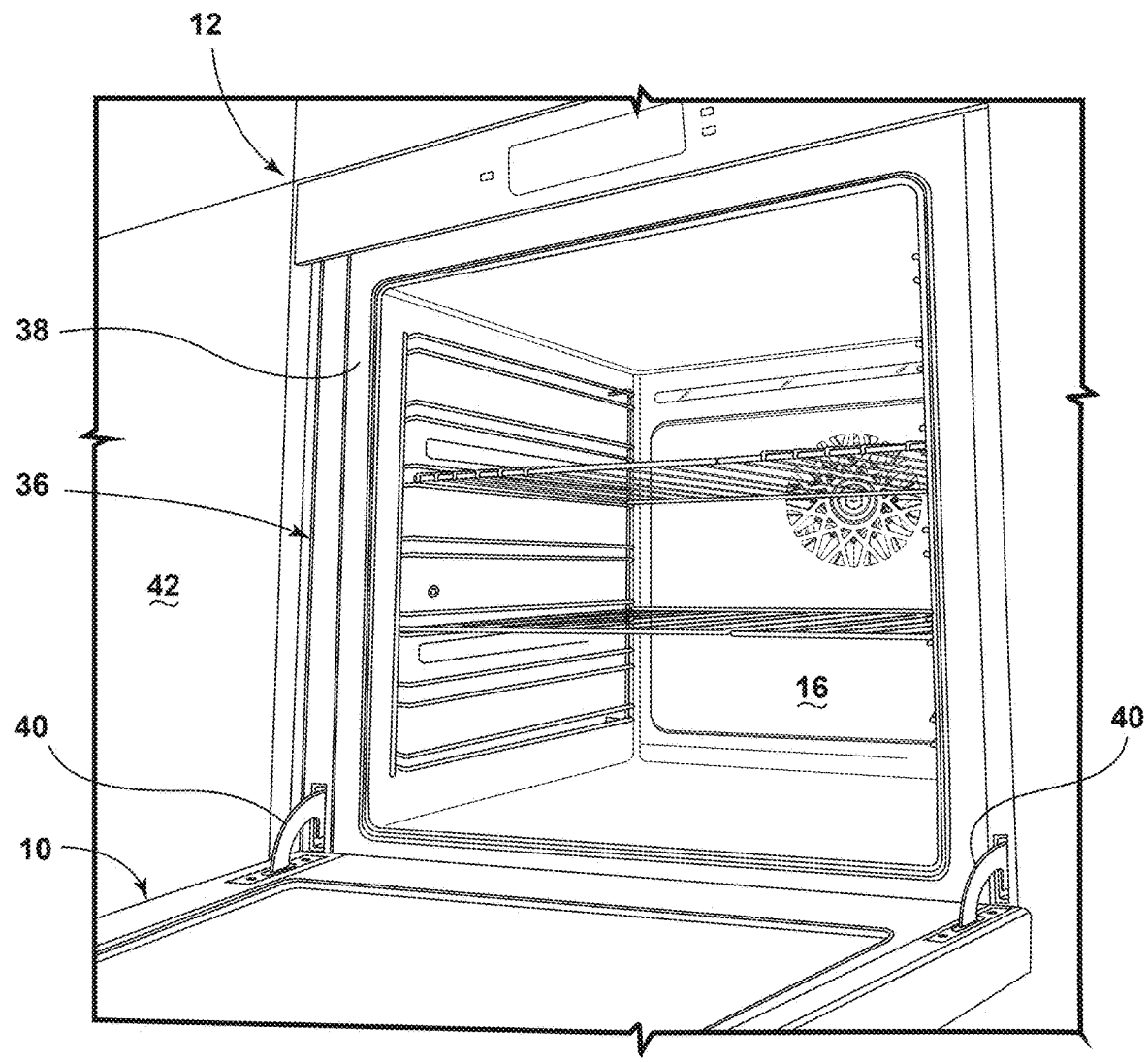
FIG. 1 is a front perspective view of a cooking appliance incorporating a door according to one aspect of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a door for a cooking appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-4, reference numeral 10 generally refers to a door for a cooking appliance 12. The door 10 includes an inner door assembly 14 disposed adjacent a cooking cavity 16 of the cooking appliance 12 when the door assembly 14 is in a closed position. The door 10 further includes an outer door assembly 18 coupled with the inner door assembly 14. The outer door assembly 18 includes a panel 20 and a skin 22. The skin 22 bonds with the panel 20 via an insulation arrangement 24 disposed between the panel 20 and the skin 22. The insulation arrangement 24 includes a first adhesive 26 that adheres the skin 22 with a first surface 28 of the insulation arrangement 24. The insulation arrangement 24 further includes a second adhesive 30 that adheres the panel 20 with a second surface 32 of the insulation arrangement 24. The outer door assembly 18 further includes a bonding feature 34 that extends from the skin 22 to the panel 20 to permanently bond the skin 22 with the panel 20.

Referring more particularly to FIG. 1, the door 10 is illustrated as being coupled to the cooking appliance 12. The cooking appliance 12 is illustrated as a wall-mounted oven. It is contemplated that the door 10 described herein may be used with a variety of doors for a variety of cooking appliances including, for example, microwave ovens, ranges, toaster ovens, and the like. The cooking appliance 12 includes a casing 36 that encloses the cooking cavity 16, as well as a frame 38 to which the door 10 is coupled. The door 10 is pivotable about a hinge 40 between an open position and a closed position. In the open position, the cooking cavity 16 is accessible from an exterior 42 of the cooking appliance 12. In the closed position, the door 10 covers the cooking appliance 12 to allow the cooking cavity 16 to heat in response to initiation of a cooking cycle.

Figure 2:
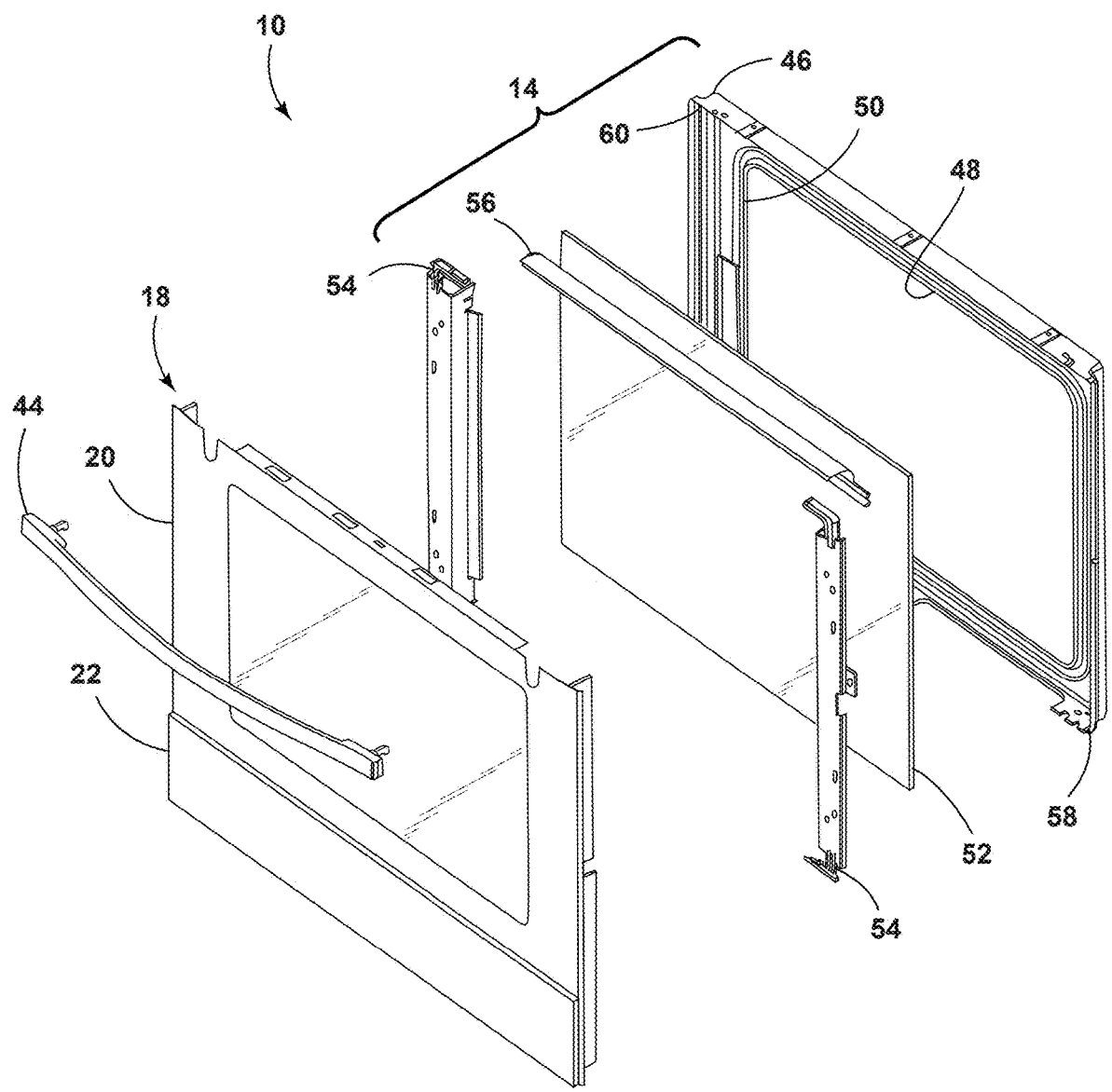
FIG. 2 is an exploded perspective view of a door according to one aspect of the present disclosure.

Referring now to FIG. 2, the door 10 includes a handle 44 coupled to the outer door assembly 18. The inner door assembly 14 generally includes an inner frame 46 having a first opening 48 defined by an inner flange 50 through which an inner glass panel 52 is visible. The door 10 includes a pair of side brackets 54 and for mounting the inner glass panel 52 to the inner frame 46 and an upper bracket 56. The inner frame 46 includes a securing mechanism 58, such as a peripheral flange, extending about a first periphery 60 of the inner frame 46. The outer door assembly 18 engages the peripheral flange and receives one or more fasteners (not shown) to secure the outer door assembly 18 to the inner door assembly 14. It is generally contemplated that additional glass panels may be included between the outer door assembly 18 and the inner door assembly 14. For example, a pair of additional glass panels may be disposed between the outer door assembly 18 and the inner frame 46 to provide additional insulation and/or cooling effects to the door 10.

Figure 3:
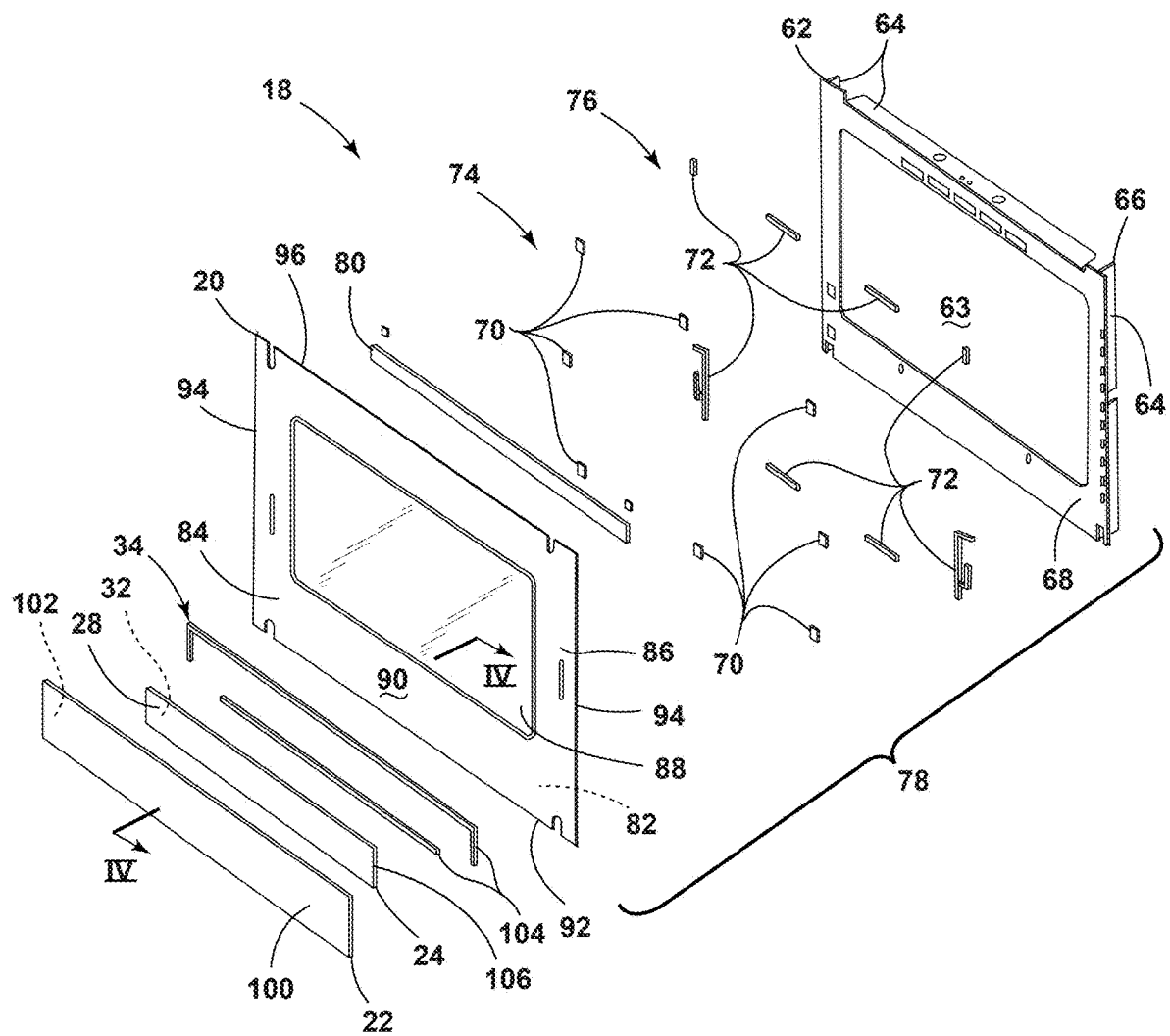
FIG. 3 is an exploded perspective view of an outer door assembly of the door shown in FIG. 2.

Referring to FIG. 3, detailed features of the outer door assembly 18 are illustrated. As exemplarily shown, the outer door assembly 18 includes an outer frame 62 defining a second opening 63 through which an outer panel, herein referred to as the panel 20, is visible. The outer frame 62 includes attachment members 64 extending about a second periphery 66 of the outer frame 62 for engaging the securing mechanism 58 of the inner frame 46. The outer frame 62, alternatively referred to herein as a backing plate, includes a backing surface 68 generally facing opposite the inner door assembly 14 (e.g., facing the exterior 42). A plurality of securing members 70, 72 is disposed between the backing surface 68 and the panel 20 to secure the panel 20 to the backing plate 62. The plurality of securing members 70, 72 may be arranged to adhesively connect the backing plate 62 and the panel 20. The plurality of securing members 70, 72 includes one more preliminary securing members 70 and one or more permanent securing members 72. The preliminary securing members 70 may include double-sided tape arranged in one or more continuous strands, or arranged in a first array 74 of tape pieces spaced from one another, as illustrated. The tape may include a foam layer disposed between two acrylic adhesive layers. For example, the tape may be very-high bonding tape sold by 3M™, such as 4930 VHB™ tape.

The preliminary securing members 70 secure the panel 20 to the backing plate 62 during a curing time of the permanent securing members 72. For example, the permanent securing members 72 may include a bonding element, such as a continuous bead of glue, or, as illustrated, a second array 76 of glue deposits spaced from one another for permanently securing the panel 20 to the outer frame 62. The glue may be a room temperature vulcanizing glue (RTV glue) comprising silicone. In some configurations, the RTV glue has a curing time of approximately five minutes. In other configurations, the permanent securing member 72 has a curing time in the range of 1 minute to 30 minutes. It is generally contemplated that the terms permanent/permanently and preliminary/preliminarily, as used throughout the disclosure to refer to bonds or attachments, can be relative terms that are not restricted to a particular level of force required to sever connection between two components. Nor may the terms permanent/permanently and preliminary/preliminarily be interpreted as restricted to a specific duration at which a connection lasts. Rather, the term "preliminary" may refer to a state of an object that precedes another state (e.g. a "permanent" state). In other examples, the term "preliminary" refers to a temporary period of time, or a shorter amount of time than the term "permanent" may refer to. In some examples, the term "preliminary bond" may refer to a connection between two parts that expires after a first period of time (e.g., in the range of seconds, minutes, hours, days), and the term "permanent bond" may refer to a connection between two part that expires after a second period of time (e.g., years) that is substantially greater than the first period of time. In some examples, the term "preliminary bond" refers to a bond that requires less force required to break the bond than an amount of force required to break another bond.

The outer frame 62 and the panel 20 together form a subassembly 78 when either or both of the securing members 70, 72 secures the panel 20 to the outer frame 62. The preliminary securing members 70 may allow the subassembly 78 to be freely moved during the first curing time without causing disassembly of the subassembly 78. In this way, a manufacturing process for the door 10 may be more efficient than processes lacking the preliminary securing member 70. In some configurations, the subassembly 78 includes an insulating substrate, such as a first foil layer 80, disposed between the panel 20 and the backing surface 68 for restricting heat radiation transfer to the panel 20. The first foil layer 80, as well as the securing members 70, 72, are secured between the backing surface 68 and a rearward surface 82 of the panel 20 that faces the backing surface 68.

With continued reference to FIG. 3, the panel 20 also includes a frontward surface 84, opposite the rearward surface 82, for supporting the skin 22 of the outer door assembly 18. As previously described, the panel 20 may be comprised of glass, such as tempered glass. The glass may have an outer portion 86 that is substantially opaque via inclusion of a coating, such as a metallic coating, that may insulate the outer portion 86 of the panel 20. The panel 20 further includes a transparent inner portion 88 that is generally aligned with the first opening 48 and the second opening 63 to allow viewing of the cooking cavity 16 from the exterior 42. As illustrated, the skin 22 is disposed adjacent to a lower portion 90 of the door 10 and adjacent to a bottom edge 92 of the panel 20. In addition, the skin 22 is disposed between side edges 94 of the panel 20. According to some aspects of the disclosure, the skin 22 extends upwardly toward a top edge 96 of the panel 20 to cover side portions 98 of the door 10.

In some configurations, the skin 22 is metallic in composition. Due to the metallic composition or coating of the skin 22, the skin 22 is thermally conductive. For example, the skin 22 can have a higher thermal conductivity than the panel 20. As a result of the relatively high thermal conductivity, the insulation arrangement 24 is employed between the skin 22 and the panel 20 to reduce a surface temperature of the skin 22. For example, the insulation arrangement 24 may be employed to achieve a skin surface temperature of less than 67 degrees Celsius. The insulation arrangement 24 also provides for a connection between the skin 22 and the panel 20. By combining connection and insulation functions of the outer door assembly 18 into the insulation arrangement 24, regions on the skin 22 corresponding to the adhesive connection may not be subject to high thermoconductivity, as may be the case with double-sided VHB™ tape. Further, providing the connection and insulation functions of the outer door assembly 18 in a single component (e.g., the insulation arrangement 24) may simplify the assembly process and avoid undesirable interference of insulation with the bonding feature 34.

Figure 4:
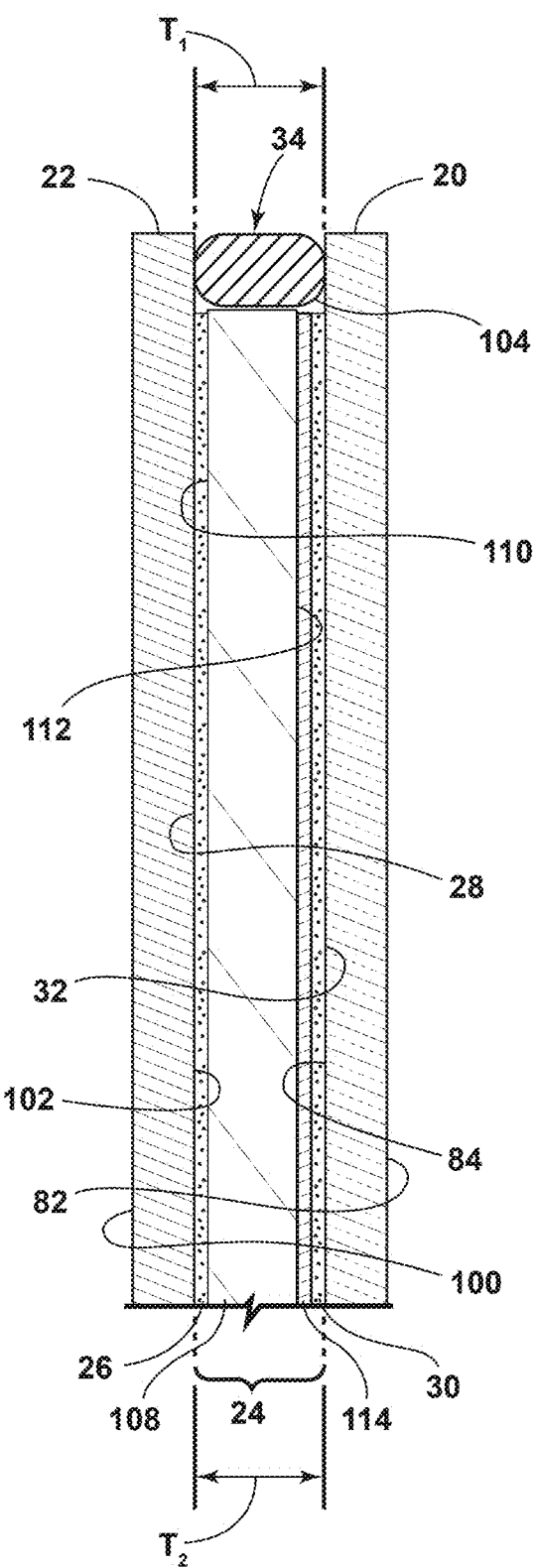
FIG. 4 is a side cross-sectional view of a portion of the outer door assembly of FIG. 3 taken at line IV.

Referring to FIGS. 3 and 4, the skin 22 extends between the exterior surface 100, facing the exterior 42, and an interior surface 102 facing the panel 20. The insulation assembly 24 is disposed between the frontward surface 84 of the panel 20 and the interior surface 102 of the skin 22. Although illustrated as having a rectangular shape, it is generally contemplated that the insulation arrangement 24 may be any polygonal or arcuate shape, and/or may be discontinuous having separate pieces. The insulation arrangement 24 may alternatively have a webbed pattern or another pattern that is operable to insulate the skin 22 from the panel 20.

In some configurations, the bonding feature 34 at least partially circumscribes the insulation arrangement 24. For example, as discussed further in reference to FIG. 6, the bonding feature 34 can include one or more beads 104 disposed about an outer edge 106 of the insulation arrangement 24 for permanently bonding the skin 22 with the panel 20. The bonding feature 34 may abut or be spaced from the outer edge 106 of the insulation arrangement 24, but generally extends between the frontward surface 84 of the panel 20 and the interior surface 102 of the skin 22. In this way, the insulation arrangement 24, which includes a preliminary coupling feature (e.g., the first and second adhesives 26, 30), and the bonding feature 34 are parallel to one another. Stated differently, the bonding feature 34 and the preliminary coupling feature (e.g., the first and second adhesives 26, 30) may be separate from and/or independent from one another to secure the skin 22 to the panel 20.

In some configurations, a first thickness $T_1$ of the bonding feature 34 is equal to or greater than a second thickness $T_2$ of the insulation arrangement 24. In this way, both the bonding feature 34 and the insulation arrangement 24 may bond the skin 22 to the panel 20 independently from one another. The first thickness $T_1$ may refer to a minimum distance between the interior surface 102 and the frontward surface 84 measured orthogonal to one of the interior surface 102 and the frontward surface 84. The second thickness $T_2$ may refer to a minimum distance between the first surface 28 and the second surface 32 measured orthogonal to one of the first surface 28 and the second surface 32. It is generally contemplated that the bonding feature 34 may be a room temperature vulcanizing glue (RTV glue), having a similar curing time as the permanent securing member 72. For example, the bonding feature 34 may have a curing time of approximately five minutes. In other configurations, the bonding feature 34 has a curing time in the range of one minute to 30 minutes.

Referring now to FIG. 4, the insulation arrangement 24 includes an insulation layer 108 having a third surface 110 and an opposing fourth surface 112. The third surface 110 corresponds with, and may be continuous with, the first adhesive 26. In some configurations, the fourth surface 112 has a metallic (e.g., aluminum) backing, such as a second foil layer 114, attached thereto to restrict heat radiation transfer from the panel 20 to the skin 22. The second adhesive 30 is disposed between the frontward surface 84 of the panel 20 and the second foil layer 114. According to some aspects, the second foil layer 114 is integrally formed with the second surface 32 of the insulation arrangement 24, such that the second adhesive 30 operably couples the insulation arrangement 24 with the panel 20. It is generally contemplated that the second foil layer 114 is omitted in some configurations, with the second adhesive 30 disposed directly on the fourth surface 112 and extending between the fourth surface 112 and the frontward surface 84 of the panel 20.

In some configurations, the first and second adhesives 26, 30 are glue or another adhesive fastener deposited on the first surface 28 and the second foil layer 114, respectively, and serve to preliminarily bond the skin 22 with the panel 20 while the bonding feature 34 cures. More specifically, the first and second adhesives 26, 30 bond the skin 22 with the panel 20 while the bonding feature 34 cures. In this way, the outer door assembly 18 is freely movable during at least a part of the curing time of the bonding feature 34, thereby creating a more efficient manufacturing process for the door 10.

In some implementations, the insulation layer 108 is formed of a heat-transfer resistant material, such as a foam. The insulation layer 108 can include fiberglass, neoprene, ceramic materials, silicone, and the like. According to some configurations, the insulation layer 108 is unitary with the first and second adhesives 26, 30. For example, the first and second adhesives 26, 30 may be pre-applied to the insulation layer 108 and the second foil layer 114, respectively. In this way, the insulation arrangement 24 may be a preformed assembly having removable backings that, when removed from the insulation arrangement 24, expose the first and second adhesives 26, 30.

As previously described, the curing time of the bonding feature 34 is substantially greater than a curing time of the first and second adhesives 26, 30 in some implementations of the present disclosure. In some examples, a first curing time of the bonding feature 34 and second curing time of the permanent securing member 72 are in the range of two minutes to 10 minutes. In particular examples, the first and second curing times are approximately five minutes each. The preliminary securing member 70 (e.g., the first array 74) and/or the preliminary coupling feature (e.g., the first and second adhesives 26, 30) may have substantially shorter curing times than either or both of the first and second curing times. For example, the preliminary securing member 70 and/or the preliminary coupling feature (e.g., the first and second adhesives 26, 30) can have curing times in the range of 0.1 seconds to one minute. In other examples, the curing times corresponding to the preliminary securing member 70 and/or the preliminary coupling feature (e.g., the first and second adhesives 26, 30) are approximately one second to ten seconds. Given the disparity between the curing times of the preliminary securing member 70 and the permanent securing member 72, the preliminary securing member 70 may serve as a temporary coupling mechanism to allow the subassembly 78 to be subject to other operations in the manufacturing process of the door 10. Similarly, given the disparity between the curing times of the preliminary coupling feature (e.g., the first and second adhesives 26, 30) and the bonding feature 34, the preliminary coupling feature (e.g., the first and second adhesives 26, 30) may serve as a temporary coupling mechanism to allow the outer door assembly 18 to be subject to other operations in the manufacturing process of the door 10.

By way of example, a first process of forming the subassembly 78 can occur simultaneously with a second process of attaching the skin 22 to the panel 20. More specifically, the first curing time can take place during the second curing time. Additionally, or alternatively, the outer door assembly 18 is secured with the inner door assembly 14, and/or the door 10 (e.g., both the outer door assembly 18 and the inner door assembly 14) is secured with the cooking appliance 12 during one or both of the first and second curing times. In this way, significant reductions in downtime of the assembly process may be provided due, at least in part, to the preliminary bonding methods.

Figure 5:
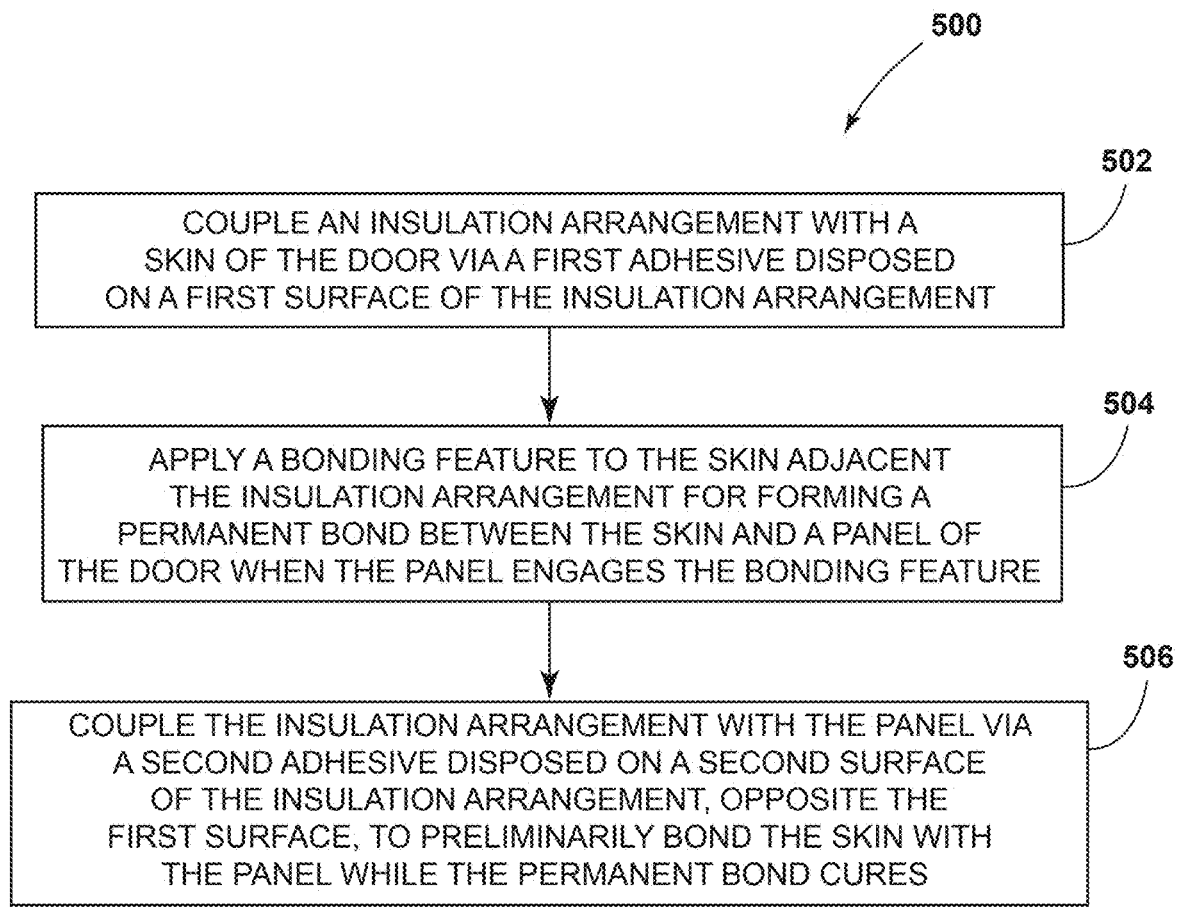
FIG. 5 is a flowchart of a method of assembling a door for a cooking appliance according to one aspect of the present disclosure.

Referring now to FIG. 5, a method for assembling the door 10 of the cooking appliance 12, such as an oven, is provided. The method includes coupling the insulation arrangement 24 with the skin 22 of the door 10, via the first adhesive 26 disposed on the first surface 28 of the insulation arrangement 24, at step 502. At step 504, the bonding feature 34 is applied to the skin 22 adjacent to the insulation arrangement 24 for forming a permanent bond between the skin 22 and the panel 20 when the panel 20 engages the bonding feature 34. At step 506, the insulation arrangement 24 is coupled with the panel 20 of the door 10 via the second adhesive 30 disposed on the second surface 32 of the insulation arrangement 24 to preliminarily bond the skin 22 with the panel 20 while the permanent bond cures.

Figure 6:
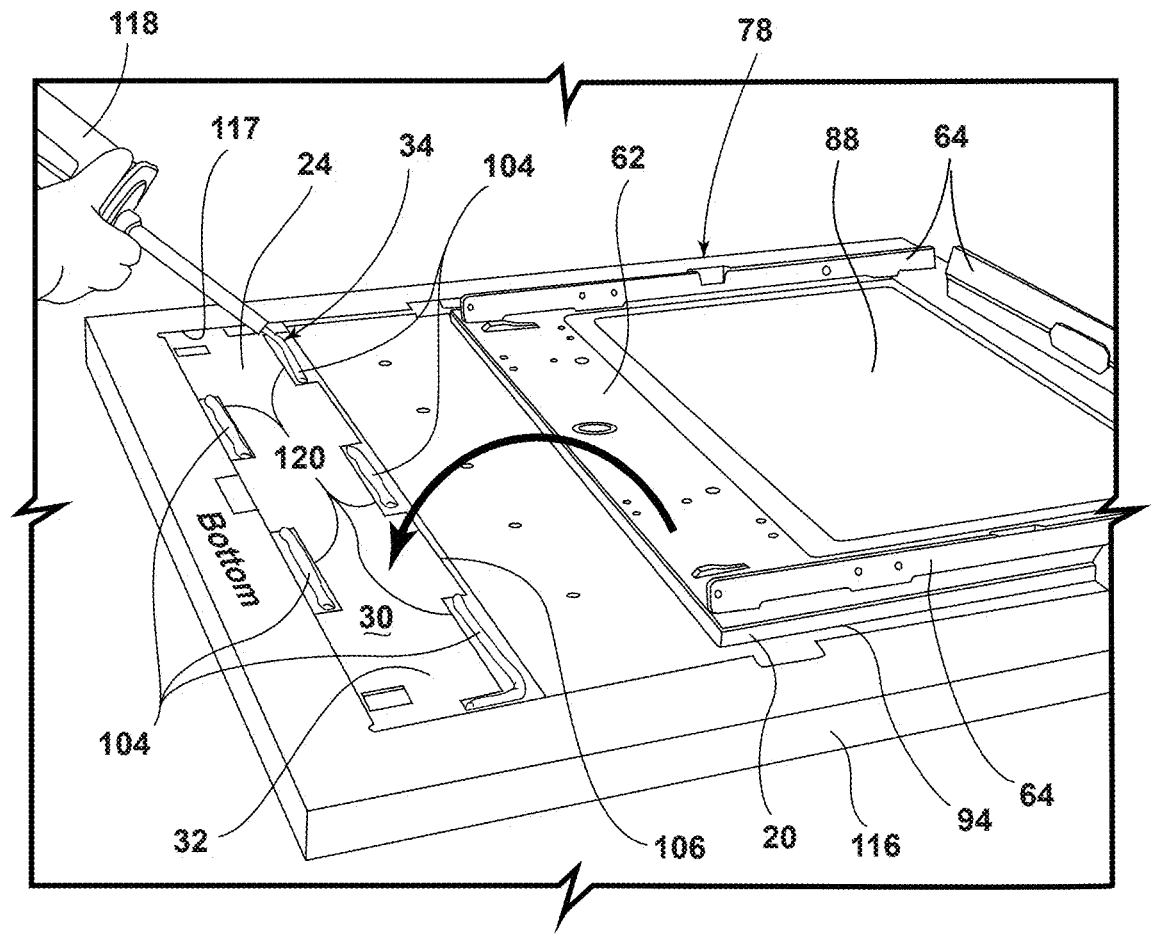
FIG. 6 is a bottom perspective view of an outer door assembly undergoing a step of the method of assembling the door of FIG. 5.

Referring now to FIG. 6, an exemplary outer door assembly 18 is illustrated undergoing step 504 of the method 500. More specifically, the outer door assembly 18 is illustrated with the skin 22 placed face-down in a fixture 116 that receives and aligns the outer door assembly 18. The bonding feature 34 is applied to the skin 22 via a glue applicator, such as a glue gun 118. More particularly, the fixture 116 defines an aperture 117 in which the skin 22 is disposed. As illustrated, the insulation arrangement 24 may define a plurality of notches 120 extending into the outer edge 106 of the insulation arrangement 24. During the assembly process, the beads 104 of the bonding feature 34 are disposed on the skin 22 in the at least one of the plurality of notches 120. In this way, the bonding feature 34 is adjacent at least a portion of the outer edge 106 of the insulation arrangement 24. According to some aspects, the notches 120 allow an area of the skin 22 adhering to the insulation arrangement 24 to be maximized to provide heat resistivity to the outer door assembly 18.

As illustrated by the heavy arrow in FIG. 6, in preparation for step 506 (e.g., coupling the panel 20 with the skin 22), the subassembly 78 may be spaced from the skin 22. The subassembly 78 may then be lifted, via an operator such as a human operator or robotic mechanism, and vertically aligned with the skin 22, as indicated by the heavy arrow of FIG. 6. The subassembly 78 is then pressed onto the insulation arrangement 24 and the bonding feature 34 adjacent the bottom portion 90 of the panel 20. Pressure is maintained on the subassembly 78 for a pressure time of approximately five seconds to 30 seconds to secure the preliminary bond. In some cases, pressure is maintained for approximately 10 seconds. After the pressure time has elapsed, the outer door assembly 18 is removed from the fixture 116 and is freely moveable while the bonding feature 34 cures.

The insulation arrangement 24 of the present disclosure may provide for alignment of parts, such as the skin 22 and the panel 20, of the outer door assembly 18 by providing a stable connection between the skin 22 and the panel 20 while the permanent bonding feature 34 cures. Further, the insulation arrangement 24 of the present disclosure may provide for a more efficient manufacturing process of the door 10 by allowing the outer door assembly 18 to be moved and/or handled in other processes while the permanent bonding feature 34 cures. The door 10 of the present disclosure may also provide for improved heat management on the skin 22, or outer cover, of the door 10. The door 10 of the present disclosure may further eliminate various manufacturing stations, or pallets, employed for applying pressure to the door 10 via clamping mechanisms and the like. Other fixtures that incorporate alignment features, such as pin and through-hole arrangements, for maintaining alignment of the skin 22 with the panel 20 during curing time of the permanent bonding feature 34 may also be omitted according to some provisions of the disclosed door 10.

According to an aspect of the present disclosure, a door assembly for a cooking appliance includes an inner door assembly disposed adjacent a cooking cavity of the cooking appliance when the door is in a closed position. An outer door assembly is coupled with the inner door assembly. The outer door assembly includes a panel. A skin bonds with the panel via an insulation arrangement disposed between the panel and the skin. The insulation arrangement includes a first adhesive that adheres the skin with a first surface of the insulation arrangement and a second adhesive that adheres the panel with a second surface of the insulation arrangement. A bonding feature extends from the skin to the panel to permanently bond the skin with the panel.

According to another aspect of the present disclosure, the skin preliminarily bonds with the panel via the insulation arrangement.

According to still another aspect of the present disclosure, an insulation arrangement includes an insulation layer that has an aluminum backing.

According to another aspect of the present disclosure, a first surface is disposed on an insulation layer and a second surface is disposed on an aluminum backing.

According to yet another aspect of the present disclosure, a door assembly includes a backing plate coupled with a panel. An insulating substrate is disposed between the backing plate and the panel.

According to another aspect of the present disclosure, a bonding feature is room-temperature vulcanizing glue.

According to still another aspect of the present disclosure, first and second adhesives bond a skin with a panel while a bonding feature cures.

According to yet another aspect of the present disclosure, a curing time of a bonding feature is substantially greater than a curing time of first and second adhesives.

According to another aspect of the present disclosure, a first thickness of a bonding feature is at least a second thickness of an insulation arrangement.

According to still another aspect of the present disclosure, a bonding feature is adjacent to at least a portion of an outer edge of an insulation arrangement.

According to another aspect of the present disclosure, an outer door assembly for an oven includes a skin. A panel is disposed between a cooking cavity of the oven and the skin. An insulation arrangement is disposed between the panel and the skin. The insulation arrangement includes an adhesive disposed on a surface of the insulation arrangement that operably couples the skin with the panel.

According to still another aspect of the present disclosure, an outer door assembly includes a bonding feature separate from first and second adhesives that extends between a skin and a panel for permanently bonding the skin to the panel via a permanent bond formed after a curing of the bonding feature.

According to another aspect of the present disclosure, a first thickness of a bonding feature is equal to or greater than a second thickness of an insulation arrangement.

According to yet another aspect of the present disclosure, a method used to assemble a door of an oven includes a step where an insulation arrangement is coupled with a skin of the door via a first adhesive disposed on a first surface of the insulation arrangement. A bonding feature is then applied to the skin adjacent the insulation arrangement to form a permanent bond between the skin and a panel of the door. Next, the insulation arrangement is coupled with the panel of the door via a second adhesive disposed on a second surface of the insulation arrangement, opposite the first surface, to bond the skin with the panel while the permanent bond cures.

According to another aspect of the present disclosure, a curing time associated with first and second adhesives is substantially less than a curing time that corresponds to a permanent bond.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A door for a cooking appliance, comprising:
   an inner door assembly disposed adjacent a cooking cavity of the cooking appliance when the door is in a closed position; and
   an outer door assembly coupled with the inner door assembly, the outer door assembly comprising:
      a panel;
      a skin bonding with the panel via an insulation arrangement disposed between the panel and the skin, the insulation arrangement including a first adhesive adhering the skin with a first surface of the insulation arrangement and a second adhesive adhering the panel with a second surface of the insulation arrangement; and
      a bonding feature extending from the skin to the panel to permanently bond the skin with the panel, wherein the insulation arrangement defines a plurality of notches extending into an outer edge of the insulation arrangement, and wherein a portion of the bonding feature is disposed within each of the notches.

2. The door of claim 1, wherein the skin bonds with the panel via the insulation arrangement prior to curing of the bonding feature.

3. The door of claim 1, wherein the insulation arrangement includes an insulation layer having an aluminum backing.

4. The door of claim 3, wherein the first surface is disposed on the insulation layer and the second surface is disposed on the aluminum backing.

5. The door of claim 1, further comprising:
   a backing plate coupled with the panel; and
   an insulating substrate disposed between the backing plate and the panel.

6. The door of claim 1, wherein the bonding feature is room-temperature vulcanizing glue.

7. The door of claim 6, wherein first and second adhesives bond the skin with the panel while the bonding feature cures.

8. The door of claim 7, wherein a curing time of the bonding feature is greater than a curing time of the first and second adhesives.

9. The door of claim 1, wherein a first thickness of the bonding feature is at least a second thickness of the insulation arrangement.

10. An outer door assembly for an oven, comprising:
    a skin;
    a panel disposed between a cooking cavity of the oven and the skin;

an insulation arrangement disposed between the panel and the skin, the insulation arrangement including an adhesive disposed on a surface of the insulation arrangement operably coupling the skin with the panel; and a bonding feature at an outer edge of the insulation arrangement proximate notches defined in the insulation arrangement.

11. The outer door assembly of claim 10, wherein the insulation arrangement includes an insulation layer having an aluminum backing.

12. The outer door assembly of claim 11, wherein the adhesive is disposed on the insulation layer and the aluminum backing.

13. The outer door assembly of claim 10, further comprising:

a backing plate coupled with the panel; and an insulating substrate disposed between the backing plate and the panel.

14. The outer door assembly of claim 10, wherein the bonding feature is separate from the adhesive and extends between the skin and the panel for permanently bonding the skin to the panel via a permanent bond formed after a curing time of the bonding feature.

15. The outer door assembly of claim 14, wherein the adhesive bonds the skin with the panel while the bonding feature cures.

16. The outer door assembly of claim 14, wherein the curing time of the bonding feature is greater than a curing time of the first and second adhesives.

17. The outer door assembly of claim 14, wherein a first thickness of the bonding feature is equal to or greater than a second thickness of the insulation arrangement.

18. A method of assembling a door of an oven, comprising:

coupling an insulation arrangement with a skin of said door via a first adhesive disposed on a first surface of the insulation arrangement, the insulation arrangement defining a plurality of notches at an outer edge of the insulation arrangement;

applying a bonding feature adjacent the outer edge of the insulation arrangement to the skin adjacent the insulation arrangement for forming a permanent bond between the skin and a panel of said door when the panel engages the bonding feature, wherein the plurality of notches allow an area of the skin adhering to the insulation arrangement to be maximized to provide heat resistivity to said door; and coupling the insulation arrangement with the panel via a second adhesive disposed on a second surface of the insulation arrangement, opposite the first surface, to bond the skin with the panel while the permanent bond cures.

* * * * *